United States Patent [19]

Hart

[11] Patent Number: 4,690,463
[45] Date of Patent: Sep. 1, 1987

[54] FREIGHT BRAKE CONTROL VALVE HAVING AN EMERGENCY PISTON SLIDE VALVE ARRANGED TO PROVIDE AN ACCELERATED BRAKE APPLICATION FUNCTION

[75] Inventor: James E. Hart, Trafford, Pa.

[73] Assignee: American Standard Inc., Wilmerding, Pa.

[21] Appl. No.: 853,519

[22] Filed: Apr. 18, 1986

[51] Int. Cl.[4] ............................................. B60T 15/30
[52] U.S. Cl. ........................................ 303/37; 303/9;
303/33
[58] Field of Search ...................... 303/7, 8, 9, 38, 39,
303/37, 22 R, 23 R, 33, 35

[56] References Cited

U.S. PATENT DOCUMENTS 2,707,134  4/1955  Cook ..................................... 303/38

FOREIGN PATENT DOCUMENTS 199691  3/1958  Fed. Rep. of Germany .......... 303/7

Primary Examiner—Duane A. Reger
Assistant Examiner—Matthew C. Graham
Attorney, Agent, or Firm—G. J. Falce

[57] ABSTRACT

A freight brake control valve device in which the emergency piston slide valve is arranged to provide continuous, periodic, local reductions in the brake pipe pressure in response to initial actuation of the emergency piston when a service rate of brake pipe pressure reduction is made, in order to quickly propagate a brake pipe pressure reduction wave along the train and accordingly provide an accelerated application of the train brakes. This accelerated application function in response to a service rate of brake pipe pressure reduction is achieved concurrently with the quick action chamber "breathing" function, the latter being presently incorporated in the emergency piston slide valve to stabilize the emergency piston following initial actuation thereof, so as to prevent further actuation of the emergency piston to emergency position.

17 Claims, 5 Drawing Figures

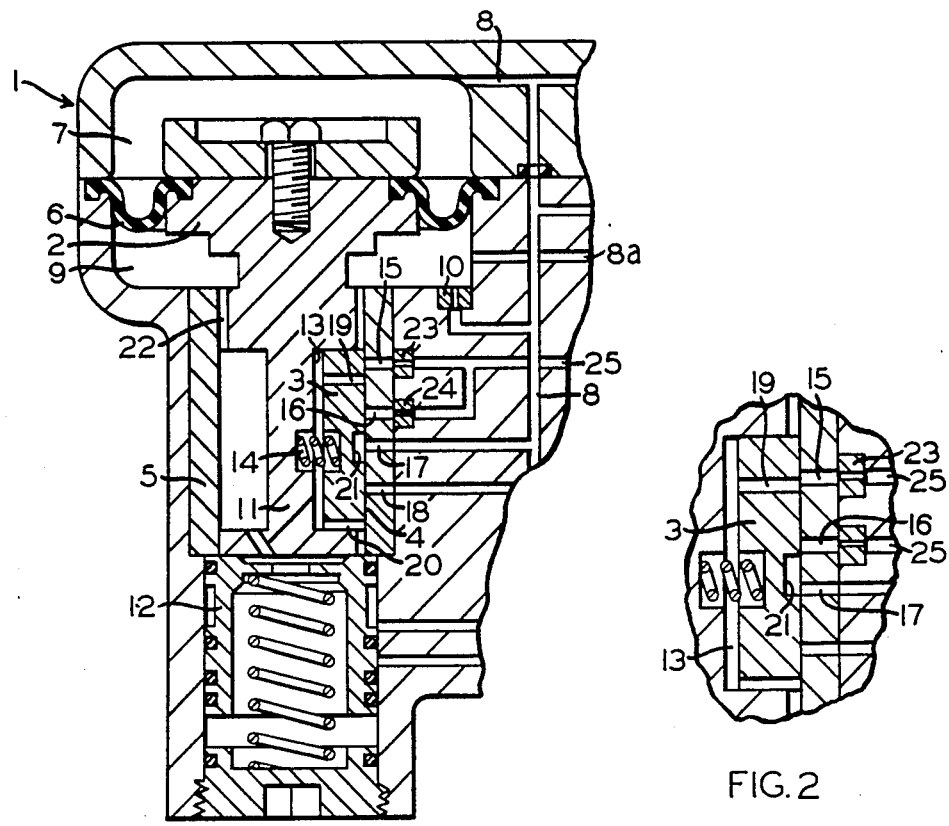
FIG. 1
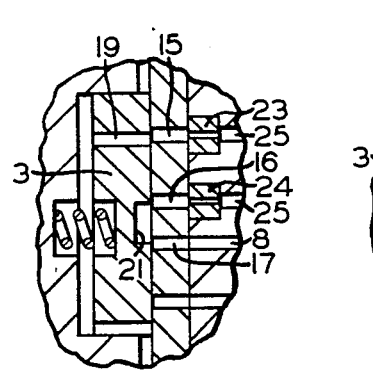
FIG. 2
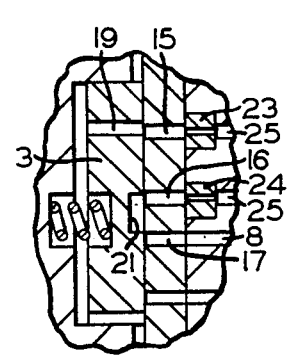
FIG. 3
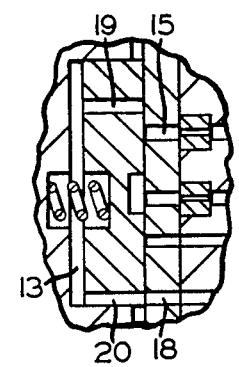
FIG. 4
FIG. 5

FREIGHT BRAKE CONTROL VALVE HAVING AN EMERGENCY PISTON SLIDE VALVE ARRANGED TO PROVIDE AN ACCELERATED BRAKE APPLICATION FUNCTION

BACKGROUND OF THE INVENTION

The present standard, A.A.R. approved, ABDW Freight Brake Control Valve manufactured by the Weststinghouse Air Brake Company, includes an accelerated application valve portion that is mounted on the valve emergency portion and operates in response to the quick action chamber "breathing" pressure developed by the emergency piston during service brake applications. Quick action chamber "breathing" is necessary during service brake applications in order to stabilize the emergency piston against undesired emergency operation. This quick action chamber "breathing" pressure is utilized to pilot the accelerated application valve which, in turn, operates to effect a local, quick service reduction of brake pipe pressure in a cyclic manner during service brake applications to thereby supplement the trainline reduction of brake pipe pressure at each car of the train.

It will be appreciated, therefore, that operation of the accelerated application valve is predicated on movement of the emergency piston to a position in which the quick action chamber pressure on one side of the piston is vented to atmosphere, and thus reduced at a rate corresponding to a service rate of reduction of the brake pipe pressure effective on the other side of the piston, thereby preventing the emergency piston from being moved further to an emergency position.

It will be further appreciated that this emergency piston includes a slide valve via which the quick action chamber pressure venting or "breathing" connection is established. In addition to providing the quick action chamber "breathing" function, the emergency piston slide valve also provides for piloting the vent valve to obtain quick action emergency. It is well known that slide valve construction is somewhat more expensive than other valve-type constructions, but a principle advantage is that multiple valve control functions can be incorporated in a relatively small valve device.

SUMMARY OF THE INVENTION

It is, therefore, an object of the present invention to provide a simplified freight brake control valve device in which the accelerated application valve function is incorporated in the already existing emergency piston slide valve.

It is a further object of the invention to eliminate the accelerated application valve portion of the standard ABDW freight control valve device in order to provide a cost and weight reduction.

Briefly, these objectives are accomplished by modifying the present ABD type freight brake control valve emergency portion by providing, in the face of the emergency piston slide valve, a groove via which additional ports provided in the slide valve seat are interconnected during normal "breathing" action of the emergency piston. This "breathing" action of the emergency piston occurs in response to movement of the piston to a position in which quick action chamber pressure on one side thereof is vented to atmosphere at a rate which prevents a service rate of brake pipe reduction effective on the other side from creating a sufficient pressure differential to actuate the piston to emergency position, thus stabilizing the emergency piston against undesired emergency during service brake applications.

The additional ports in the slide valve seat, when communicated via the aforementioned groove in the slide valve, establish a local exhaust of brake pipe pressure at each car of a train to supplement the trainline brake pipe reduction and thereby accelerate the propagation of the brake pipe reduction along the train.

By incorporating this function in the already existing emergency piston slide valve, the separate accelerated application valve portion presently employed on ABDW type freight brake control valves can be eliminated and its function carried out by the emergency piston, with only minor modification thereof. Accordingly, a weight-savings can be realized, as well as an attendant cost-savings.

BRIEF EXPLANATION OF THE DRAWINGS

These and other objects and attendant advantages will become apparent from the following more detailed explanation when taken in accordance with the accompanying drawings, wherein:

FIG. 1 is a diagrammatic view, in section, showing the emergency piston of a conventional AB/D type freight brake control valve device in its release position with the slide valve and slide valve seat thereof modified in accordance with the present invention;

FIG. 2 is an enlarged, fragmentary view of the emergency piston, slide valve and slide valve seat of the present invention shown in an initial service "breathing" position.

FIG. 3 is an enlarged, fragmentary view of the emergency piston, slide valve and slide valve seat of the present invention shown in an intermediate stage of accelerated application;

FIG. 4 is an enlarged, fragmentary view of the emergency piston, slide valve and slide valve seat of the present invention shown in a cut-off stage of accelerated application; and FIG. 5 is an enlarged, fragmentary view of the emergency piston, slide valve and slide valve seat of the present invention shown in emegency position.

DESCRIPTION AND OPERATION

Referring to FIG. 1 of the drawings, there is shown incorporated in the emergency portion 1 of a conventional freight brake control valve device, such as the AB/D freight brake control valve manufactured by the Westinghouse Air Brake Company, an emergency piston 2 having a slide valve 3, the planar face 4 of which engages the conforming seat in a slide valve bushing 5. A diaphragm 6 of piston 2 forms with the valve body, a chamber 7 on one side, to which the compressed air carried in the trainline brake pipe (not shown) is connected via a brake pipe branch passage 8, and a chamber 9 on the opposite side subject to the compressed air in a quick action chamber (not shown). The quick action chamber pressure is charged from brake pipe branch passage 8 via a choke 10, chamber 9, and a passage 8a; so that during brake pipe charging, the pressure in chamber 7 is greater than the pressure in chamber 9, and the effective force due to this pressure differential acting across the area of the piston establishes and maintains the piston in its lower-most release position (as shown) until such time as the brake pipe pressure is reduced. This release position is determined by engagement of the emergency piston tail 11 with a springloaded spool valve 12 that provides the well-known emergency accelerated release function, which is not a part of the present invention.

In accordance with the present invention, the emergency piston slide valve 3 is housed within a recess 13 in the emergency piston, so as to move axially with the piston. A spring 14, between the slide valve 3 and the piston 2, urges the slide valve face 4 into engagement with the adjoining face of the slide valve seat formed in bushing 5 with sufficient force that the lapped interfaces therebetween provide a pressure seal between the passageways in the slide valve and bushing.

There are four such passageways 15, 16, 17, and 18 in the bushing 5, and two pasageways 19 and 20 in slide valve 3, in addition to a groove 21 that is formed in the face 4 of slide valve 3. A passage 22 in piston 2 connects quick action chamber air in chamber 9 to recess 13, wherefrom this quick action chamber air is connected to the slide valve/seat interface via passageways 19 and 20, passageway 20 being formed by a groove at the end of slide valve 3, where the slide valve abuts recess 13. Passageway 15 contains a quick action chamber breather choke 23, and passageway 16 contains an accelerated application choke 24, the latter being smaller in size than the former for a purpose hereinafter discussed. These passageways 15 and 16 are interconnected in the valve body with a passageway 25 that is vented to atmosphere. Passageway 17 is connected to passage 8, while passageway 18 is connected to auxiliary valve devices (not shown) which initiate and propagate the emergency application of the train brakes.

In the release position shown in FIG. 1, the opening of passageway 19 at the slide valve/seat interface lies intermediate passageways 15 and 16, so that the slide valve interrupts fluid pressure communication between these passageways. Similarly, groove 21 in slide valve 3 covers the opening of passageway 17 in bushing 5, so that the slide valve/seat interface interrupts fluid pressure communication between passageway 17 and either one of the passageways 16 or 18 adjacent thereto. Also, the passageway 20, formed at the end of slide valve 3, is displaced from passageway 18 to isolate fluid pressure from the aforementioned auxiliary devices with which passageway 18 is connected.

During a selective service rate of reduction of the pressure carried in the trainline brake pipe, as is well known, the service portion (not shown) of the AB/D control valve device effects a service brake application; while concurrently, the brake pipe pressure reduction is registered in chamber 7 via passage 8. Due to the fact that choke 10 prevents the quick action chamber pressure effective in chamber 9 from reducing at the same rate as the pressure reduction effective at chamber 7, a pressure differential is established across piston 2 to force the emergency piston in an upward direction toward emergency position.

As shown in FIG. 2, just prior to the groove 21 in the face of slide valve 3 uncovering passageway 16, slide valve passageway 19 begins to uncover passageway 15, thereby connecting quick action chamber pressure effective in chamber 9 and recess 13 to atmosphere via passageways 19, 15, choke 23, and passageway 25. Through this first range of movement of piston 2, the reduction of quick action chamber pressure effective in chamber 9 may be insufficient to counterbalance the brake pipe pressure reduction in chamber 7, in which case emergency piston 2 will continue to move upwardly.

As shown in FIG. 3, groove 21 in slide valve 3 will progressively uncover passageway 16; while at the same time, slide valve passageway 19 further uncovers passageway 15. Accordingly, brake pipe pressure in passage 8 is connected to atmosphere via passageway 17, groove 21, passageway 16, choke 24, and passageway 25, thereby providing a local reduction of brake pipe pressure to supplement the trainline reduction of brake pipe pressure, and accordingly provide an accelerated application of the train brakes. This movement of the piston slide valve from the position shown in FIG. 2 to the position in FIG. 3 constitutes a second range of movement during which the local exhaust of brake pipe pressure increases from zero to a maximum, as set by the size of choke 24. At the same time, slide valve passageway 19 is more fully aligned with passageway 15 in bushing 5, such that in this position, the rate of reduction of quick action chamber pressure effective in chamber 9 is determined by the size of choke 23. Also, in this position of piston 2, slide valve groove 21 establishes maximum flow communication between passageways 16 and 17, so that the size of choke 24 determines the maximum rate of reduction of the brake pipe pressure effective in chamber 7. It should be noted at this point that choke 23 is larger than choke 24 and that the relative sizes of chokes 23 and 24, as well as the port sizes of the various passageways are chosen such that the flow capacity of quick action chamber pressure to atmosphere exceeds the local flow capacity of brake pipe pressure that is exhausted to atmosphere in any slide valve position. It will be appreciated, therefore, that in the position shown in FIG. 3, the rate of reduction of the quick action chamber pressure effective in chamber 9 will exceed the rate of brake pipe reduction effective in chamber 7, in the event the trainline reduction of brake pipe pressure is terminated, in which case the pressure differential across piston 2 will be reversed and the emergency piston will be forced to its original release position. Thus, the local exhaust of brake pipe pressure that supplements the trainline reduction of brake pipe pressure cannot result in the local activity perpetuating a continuous reduction of brake pipe pressure following termination of the trainline brake pipe reduction.

The rate of reduction of brake pipe pressure which can normally occur during a service brake application varies over a fairly wide range, depending upon, for example, the length of the train, the position of a given car in the train, and the amount of brake pipe leakage that exists. This range of service rates is accounted for by the degree of upward movement of piston 2 and the consequent size of the opening between passageways 15 and 19 which, in turn, controls the rate of reduction of pressure "breathed" from the quick action chamber to match the given rate of brake pipe pressure reduction.

If the rate of brake pipe pressure reduction exceeds the normal range for a service reduction, whether reaching an emergency rate or not, the piston 2 will move upward to the position shown in FIG. 4. In this position, maximum breathing rate of quick action pressure still exists through passageways 19 and 15, as controlled by choke 23, but passageway 8 is cut-off from passageway 16 at the slide valve/seat interface, thereby interrupting the local exhaust of brake pipe pressure. Movement of the piston slide valve between the positions shown in FIGS. 3 and 4 constitutes a third range of movement during which the local brake pipe exhaust decreases from a maximum to zero. This cut-off position in which the local brake pipe reduction is terminated ensures that the local accelerated service application function does not affect the propensity of the slide valve to move to emergency position, thereby preserving the normal service stability characteristic of the AB/D type control valve.

In FIG. 5 is shown the slide valve connections made in emergency position of piston 2, when the rate of reduction of the trainline brake pipe pressure exceeds the maximum rate of reduction of quick action chamber pressure from chamber 9 via choke 23. Movement of piston 2, between the positions shown in FIGS. 4 and 5, constitutes a fourth range of motion of piston 2. In this emergency position of FIG. 5, passageway 19 in slide valve 3 is completely cut off from passageway 15 to terminate the quick action chamber "breathing", while quick action chamber pressure is connected to passageway 18 via recess 13 and passageway 20, to pilot the emergency application auxiliary valve devices and thereby initiate an emergency brake application.

I claim:

1. For use on each car of a railway train having a brake pipe interconnected to the brake pipe of an adjoining car, a control valve device operable in response to selective service and emergency rates of reduction of the pressure carried in said brake pipe for effecting either a service or an emergency brake application, said control valve device comprising:
   (a) a housing having a cavity therein;
   (b) an emergency piston in said cavity forming therewith first and second pressure chambers on opposite sides of said emergency piston, said first and second chambers being subject to said brake pipe fluid under pressure;
   (c) a first choke via which said second chamber is communicated with said brake pipe;
   (d) slide valve means carried by said emergency piston for effecting a reduction of the fluid pressure in said second chamber when said emergency piston is actuated in one direction in response to a pressure differential thereacross due to said selective reduction of the fluid pressure carried in said brake pipe, said reduction of said second chamber fluid pressure counteracting the selective reduction of said brake pipe fluid pressure effective in said first chamber, to such extent as to prevent said emergency piston from being actuated in said one direction sufficiently to establish an emergency brake application, so long as said selective reduction of fluid pressure carried in said brake pipe is at a service rate; and
   (e) said slide valve means in response to said actuation of said emergency piston in said one direction being effective for establishing a further reduction of said brake pipe fluid pressure in addition to said selective reduction of said brake pipe fluid pressure.

2. A control valve device, as recited in claim 1, further characterized in that said slide valve means establishes said reduction of said second chamber fluid pressure prior to establishing said further reduction of said brake pipe fluid pressure.

3. A control valve device, as recited in claim 2, further characterized in that said slide valve means maintains said reduction of said second chamber fluid pressure at least as long as said further reduction of said brake pipe fluid pressure is in effect during movement of said emergency piston in a direction opposite said one direction.

4. A control valve device, as recited in claim 1, further characterized in that said further reduction of said brake pipe fluid pressure is less than said reduction of fluid pressure in said second chamber, whereby said further reduction of said brake pipe fluid pressure is insufficient to maintain said pressure differential across said emergency piston to effect actuation thereof in said one direction in the absence of said selective reduction of said brake pipe fluid pressure.

5. A control valve device, as recited in claim 4, further comprising:
   (a) a second choke via which said fluid under pressure effective in said second chamber is vented to provide said reduction therein; and
   (b) a third choke via which said brake pipe fluid pressure is vented to provide said further reduction of said brake pipe fluid pressure, said second choke being larger than said third choke.

6. A control valve device, as recited in claim 5, further characterized in that the rate of said further reduction of said brake pipe fluid pressure by venting said brake pipe pressure via said third choke increases initially from zero to a maximum value determined by said third choke and subsequently decreases to zero during said actuation of said emergency piston in said one direction.

7. A control valve device, as recited in claim 6, further characterized in that said slide valve means established said reduction of said second chamber fluid pressure prior to establishing said further reduction of said brake pipe fluid pressure, and maintains said reduction of said second chamber fluid pressure during and following said further reduction of said brake pipe fluid pressure to zero.

8. A control valve device, as recited in claim 1, wherein said slide valve means comprises:
   (a) a slide valve seat;
   (b) first, second, third, and fourth passageways, each having one end opening in the face of said slide valve seat, said first and second passageways having their other end opening to atmosphere and said third passageway having its other end connected to said brake pipe;
   (c) a slide valve carried in a recess of said piston for movement therewith during said actuation in said one direction, said slide valve having a face engageable with the face of said slide valve seat, said recess being subject to the fluid pressure effective in said second chamber;
   (d) a fifth passageway in said slide valve having one end opening in said recess and the other end opening in said face of said slide valve; and
   (e) an elongated groove in the face of said slide valve, said fifth passageway being communicated with said first passageway and said groove establishing fluid pressure communication with said second and third passageways during said actuation of said emergency piston in said one direction.

9. A control valve device, as recited in claim 8, further characterized in that said fifth passageway is communicated with said first passageway prior to said groove establishing said fluid pressure communication between said second and third passageways through a first range of movement of said emergency piston during said actuation thereof in said one direction.

10. A control valve device, as recited in claim 9, wherein the dimension between said first and second passageways is less than the dimension between said fifth passageway and said groove.

11. A control valve device, as recited in claim 10, wherein flow of fluid under pressure between said groove and said second and third passageways varies between zero and a maximum and said first and fifth passageways are in fluid pressure communication concurrently through a second range of movement of said emergency piston following said first range of movement during said actuation thereof in said one direction.

12. A control valve device, as recited in claim 11, further characterized in that said groove is disengaged from communication with at least one of said second and third passageways and said fifth passageway remains in communication with said first passageway through a third range of movement of said emergency piston following said second range of movement during said actuation thereof in said one direction.

13. A control valve device, as recited in claim 12, wherein said at least one of said second and third passagewy is said third passageway, flow of fluid under pressure therebetween decreasing from said maximum to zero through said third range of movement.

14. A control valve device, as recited in claim 13, wherein the maximum elongated dimension of said groove is less than the maximum dimension between said second and third passageways.

15. A control valve device, as recited in claim 11, further comprising:
 (a) a second choke in said first passageway via which said fluid pressure effective in said second chamber is vented to provide said reduction of fluid pressure therein; and
 (b) a third choke in said second passageway via which said brake pipe fluid pressure is vented to provide said further reduction of said brake pipe fluid pressure, said second choke being larger than said third choke.

16. A control valve device, as recited in claim 12, further comprising:
 (a) a sixth passageway in said slide valve having one end open to said recess and the other end open at said face of said slide valve; and
 (b) a seventh passageway having one end open at said face of said slide valve seat, said sixth and seventh passageways being communicated, said groove interrupting communication between said second and third passageways and said communication between said first and fifth passageways being interrupted through a fourth range of movement of said emergency piston following said third range during said actuation thereof in said one direction.

17. A control valve device, as recited in claim 16, wherein said emergency piston is actuated through said fourth range of movement thereof only in response to an emergency rate of reduction of the fluid pressure carried in said brake pipe.

* * * * *

UNITED STATES PATENT AND TRADEMARK OFFICE
CERTIFICATE OF CORRECTION

PATENT NO. : 4,690,463
DATED : September 1, 1987
INVENTOR(S) : James E. Hart

It is certified that error appears in the above-identified patent and that said Letters Patent are hereby corrected as shown below:

Column 7, lines 22-23, delete "pass-agewy" and insert

--passageways--

Signed and Sealed this

Nineteenth Day of April, 1988

Attest:

DONALD J. QUIGG

*Attesting Officer*  *Commissioner of Patents and Trademarks*